(12) United States Patent
Murray

(10) Patent No.: US 11,988,100 B2
(45) Date of Patent: May 21, 2024

(54) BLOWER ASSEMBLY

(71) Applicant: ROLLS-ROYCE plc, London (GB)

(72) Inventor: Christopher A Murray, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/988,472

(22) Filed: Nov. 16, 2022

(65) Prior Publication Data

US 2023/0184131 A1 Jun. 15, 2023

(30) Foreign Application Priority Data

Dec. 14, 2021 (GB) ...................................... 2118069

(51) Int. Cl.
*F01D 17/16* (2006.01)

(52) U.S. Cl.
CPC .......... *F01D 17/16* (2013.01); *F05D 2220/32* (2013.01)

(58) Field of Classification Search
CPC .. F02C 9/20; F02C 7/277; F01D 17/14; F01D 17/141; F01D 17/167
See application file for complete search history.

(56) References Cited

U.S. PATENT DOCUMENTS

| 3,878,677 A | 4/1975 | Colvin | |
|---|---|---|---|
| 2004/0076519 A1* | 4/2004 | Halfmann | F01D 5/187 |
| | | | 416/97 R |
| 2006/0042247 A1* | 3/2006 | Haugen | F02C 3/13 |
| | | | 60/600 |
| 2011/0241344 A1 | 10/2011 | Smith et al. | |
| 2015/0275769 A1 | 10/2015 | Foutch et al. | |
| 2016/0167789 A1* | 6/2016 | Knight | B64D 13/02 |
| | | | 454/71 |
| 2016/0237909 A1* | 8/2016 | Snape | F02C 7/185 |
| 2018/0079510 A1 | 3/2018 | Bacic et al. | |
| 2023/0184131 A1 | 6/2023 | Murray | |

FOREIGN PATENT DOCUMENTS

| DE | 10 2011 120555 A1 | 6/2013 |
|---|---|---|
| EP | 3 034 405 A1 | 6/2016 |
| EP | 3 056 714 A1 | 8/2016 |

(Continued)

OTHER PUBLICATIONS

Jun. 8, 2022, Search Report issued in British Patent Application No. GB2118069.0.

(Continued)

*Primary Examiner* — Katheryn A Malatek
(74) *Attorney, Agent, or Firm* — Oliff PLC

(57) ABSTRACT

A blower assembly for providing air to an airframe system, including a rotor configured to be mechanically coupled to a spool of a gas turbine engine and a flow modifier configured to receive and/or direct flow to the rotor; wherein the blower assembly is configured to permit relative movement between the rotor and the flow modifier to move between: a compressor configuration in which the rotor is configured to be driven to rotate by the spool and to receive and compress air from the gas turbine engine, and discharge the compressed air for supply to the airframe system; and a turbine configuration in which the rotor is configured to receive air from an external air source to drive the spool to rotate.

15 Claims, 6 Drawing Sheets

(56) References Cited

FOREIGN PATENT DOCUMENTS

| | | |
|---|---|---|
| EP | 3 208 195 A1 | 8/2017 |
| EP | 3 514 350 A2 | 7/2019 |
| EP | 3 517 436 B1 | 5/2020 |
| EP | 3 517 437 B1 | 5/2020 |
| EP | 3 517 438 B1 | 6/2020 |
| GB | 1 228 297 A | 4/1971 |
| GB | 2 242 235 A | 9/1991 |

OTHER PUBLICATIONS

May 8, 2023 Extended Search Report issued in European Patent Application No. 22207104.5.
U.S. Appl. No. 18/379,976, filed Oct. 13, 2023 in the name of Murray et al.
Mar. 14, 2024 Extended Search Report issued in European Patent Application No. 23202772.2.

* cited by examiner

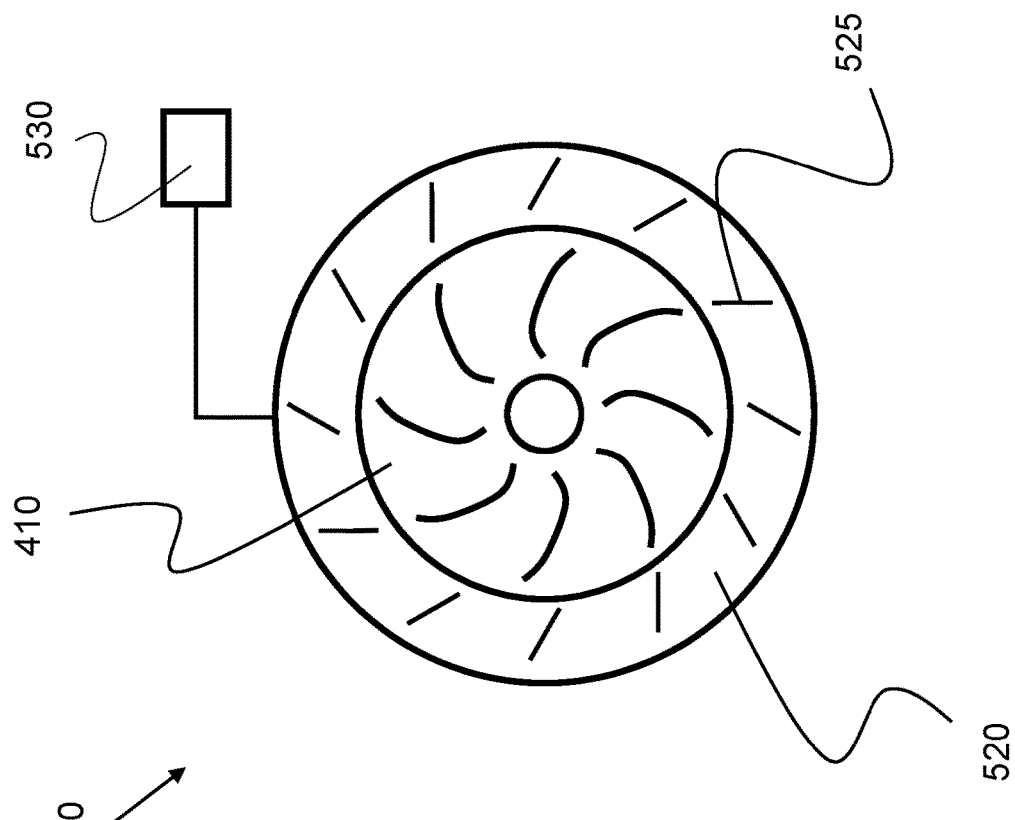
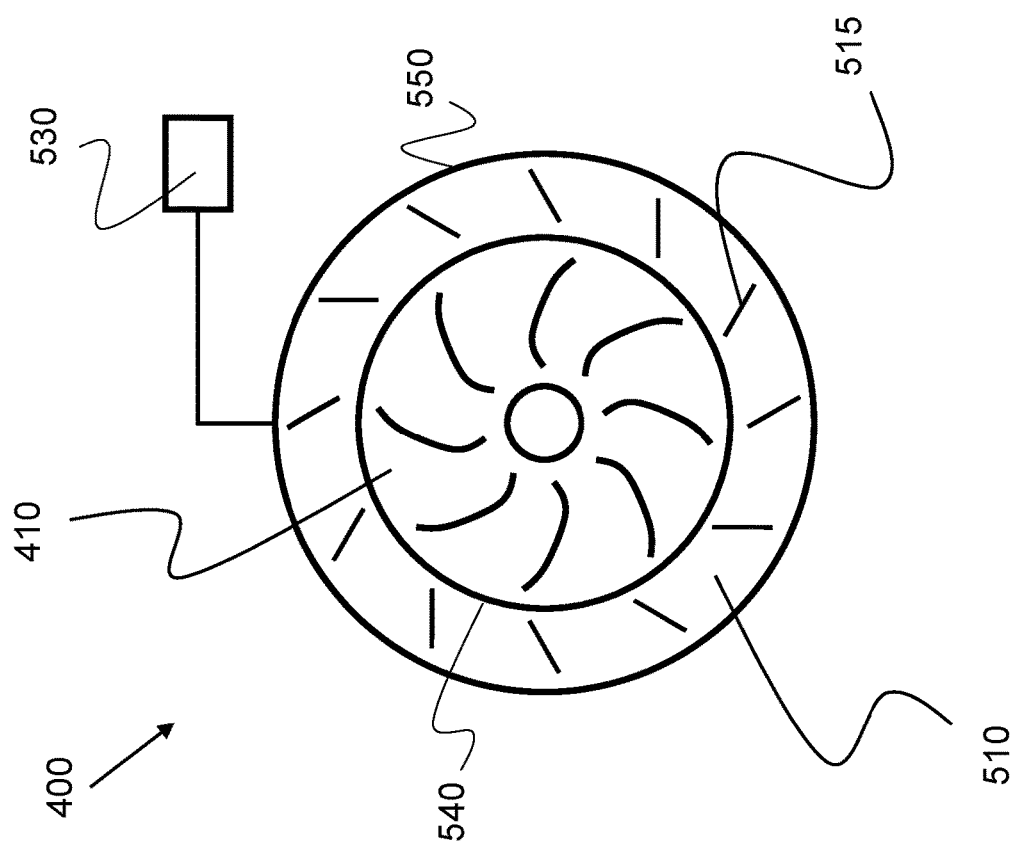

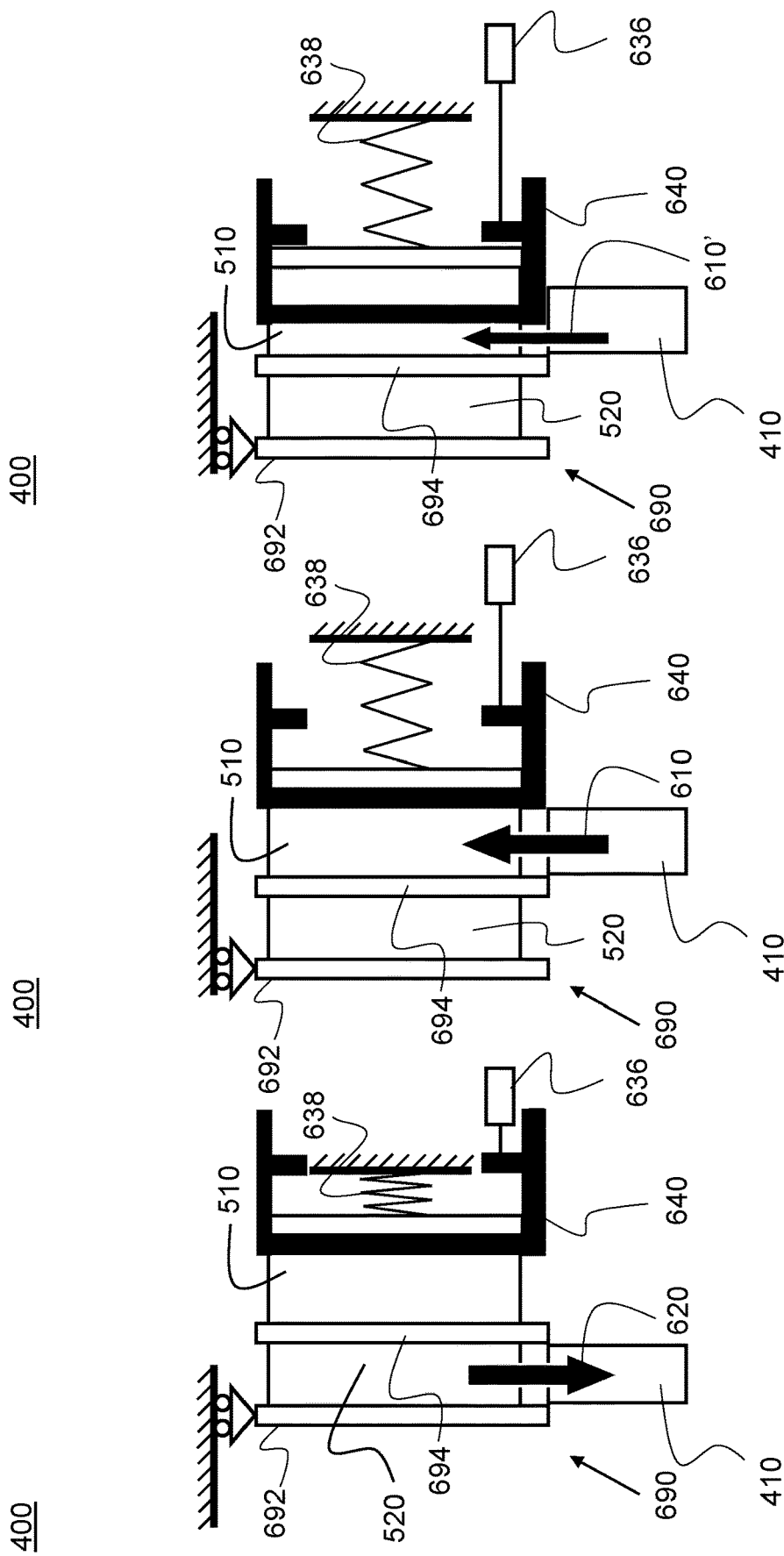

BLOWER ASSEMBLY

CROSS-REFERENCE TO RELATED APPLICATIONS

This specification is based upon and claims the benefit of priority from United Kingdom Patent Application No. 2118069.0, filed on 14 Dec. 2021, the entire contents of which are incorporated herein by reference.

TECHNICAL FIELD

The present disclosure relates to a blower assembly for an aircraft. The disclosure also concerns a gas turbine engine having a cabin blower assembly and aircraft having cabin blower assemblies.

BACKGROUND

It is known to pressurise and ventilate a cabin of an aircraft using engine bleed air which is bled from a compressor section of the core of a gas turbine engine. Bleeding high pressure air from the gas turbine engine reduces its efficiency and thereby increases its fuel consumption.

Cabin blower assemblies which make use of air which is bled from a lower pressure source of a gas turbine engine (such as a bypass duct) and which subsequently compress the engine bleed air prior to delivering it to the cabin are also known, as described in EP3517436 B1, EP3517437 B1 and EP3517438 B1.

SUMMARY

According to a first aspect, there is provided a blower assembly for providing air to an airframe system, comprising: a rotor configured to be mechanically coupled to a spool of a gas turbine engine; a flow modifier configured to receive and/or direct flow to the rotor; wherein the blower assembly is configured to permit relative movement between the rotor and the flow modifier to move between: a compressor configuration in which the rotor is configured to be driven to rotate by the spool and to receive and compress air from the gas turbine engine, and discharge the compressed air for supply to the airframe system; and a turbine configuration in which the rotor is configured to receive air from an external air source to drive the spool to.

In the turbine configuration the rotor may drive the spool to rotate for starting the gas turbine engine. Additionally or alternatively, the turbine configuration may be used to drive the spool to rotate at a speed below a starting speed of the engine, for example to reduce or prevent the formation of thermal bow of engine components.

The blower assembly may further comprise a variable transmission for mechanically coupling the rotor to the spool.

The blower assembly may be configured so that a direction of rotation of the rotor in the turbine configuration is the same as a direction of rotation of the rotor in the compressor configuration.

The flow modifier may comprise a plurality of vanes. The flow modifier may comprise at least a first set of a plurality of vanes and a second set of a plurality vanes.

The flower modifier may be a fixed geometry flow modifier. The flow modifier may comprise fixed geometry vanes (e.g. non-rotating vanes), for example a first plurality of fixed geometry vanes and a second plurality of fixed geometry vanes.

The blower assembly may comprise an actuator arrangement for causing the relative movement between the rotor and flow modifier to move the blower assembly between the compressor configuration and the turbine configuration. The actuator arrangement may be configured to move the flow modifier relative to the rotor without changing a geometry of the flow modifier, which may be a fixed geometry.

It may be that the blower assembly further comprises: a diffuser vane array comprising a plurality of diffuser vanes and configured to act together with the rotor to compress air received at the rotor in the compressor configuration; a nozzle guide vane array comprising a plurality of nozzle guide vanes and configured to act together with the rotor to expand air received at the nozzle guide vane array in the turbine configuration; and an actuator arrangement configured to: cause relative movement between the rotor and the diffuser vane array so that the diffuser vane array is disposed around the rotor for operation in the compressor configuration; and cause relative movement between the rotor and the nozzle guide vane array so that the nozzle guide vane array is disposed around the rotor for operation in the turbine configuration.

It may be that the actuator arrangement is configured to adjust an effective axial height of the diffuser vanes by varying an open area of an inlet interface between the rotor and the diffuser vane array, and/or by varying an open area of an outlet interface at a radially outer side of the diffuser vane array, wherein the effective axial height is with respect to a rotational axis of the rotor.

It may be that the diffuser vane array and the nozzle guide vane array are rigidly connected so as to form a combined vane array assembly.

It may also be that the diffuser vane array and the nozzle guide vane array are rigidly connected so as to form a combined vane array assembly, and wherein the actuator arrangement comprises: a mode actuator configured to cause relative movement between the rotor and the combined vane array assembly for moving the blower assembly between the compressor configuration and the turbine configuration; and a diffuser height actuator configured to adjust the effective axial height of the diffuser vanes.

The actuator arrangement may comprise a driving actuator configured to cause relative movement between the combined vane array assembly and the rotor to move the blower assembly between the compressor configuration and the turbine configuration.

The actuator arrangement may be configured to cause relative movement between a diffuser vane array guide and the combined vane array assembly to adjust the effective axial height of the diffuser vanes in the compressor configuration.

In addition, it may be that the driving actuator is configured to act on the diffuser vane array guide to cause relative movement between the diffuser vane array guide and the rotor over an actuator travel; a first portion of the actuator travel corresponds to movement between the turbine and compressor configurations; the actuator arrangement further comprises a biasing member configured to bias the combined vane array assembly and the diffuser vane array guide to an open configuration throughout the first portion of the actuator travel, the open configuration corresponding to unrestrained flow through the diffuser vane array;

and the actuator arrangement is configured so that a second non-overlapping portion of the actuator travel corresponds to movement of the diffuser vane array guide relative to the combined vane array assembly away from the open configuration to vary the effective axial height of the diffuser vanes in the compressor configuration.

The blower assembly may further comprise a static seal between and/or around the diffuser vane array and/or the nozzle guide vane array.

According to a second aspect there is provided a gas turbine engine for an aircraft, the gas turbine engine comprising a blower assembly in accordance with the first aspect.

According to a third aspect there is provided an aircraft comprising a blower assembly in accordance with the first aspect or a gas turbine engine in accordance with the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts (or spools) that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. According to an aspect, there is provided an aircraft comprising a cabin blower assembly or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Examples will now be described with reference to the accompanying drawings, which are purely schematic and not to scale, and in which:

FIGS. 5A-5B show front views of an example blower assembly in a compressor configuration and a turbine configuration, respectively;

FIGS. 7A-7C show cross-sectional views of another example blower assembly in the compressor configuration and the turbine configuration.

DETAILED DESCRIPTION

Figure 1:
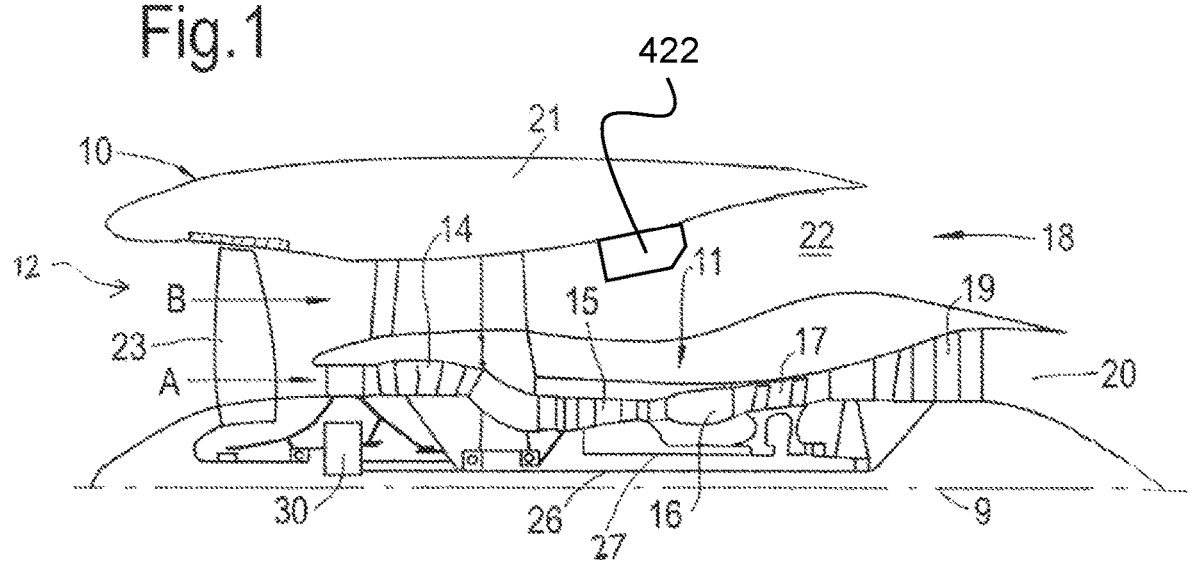
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
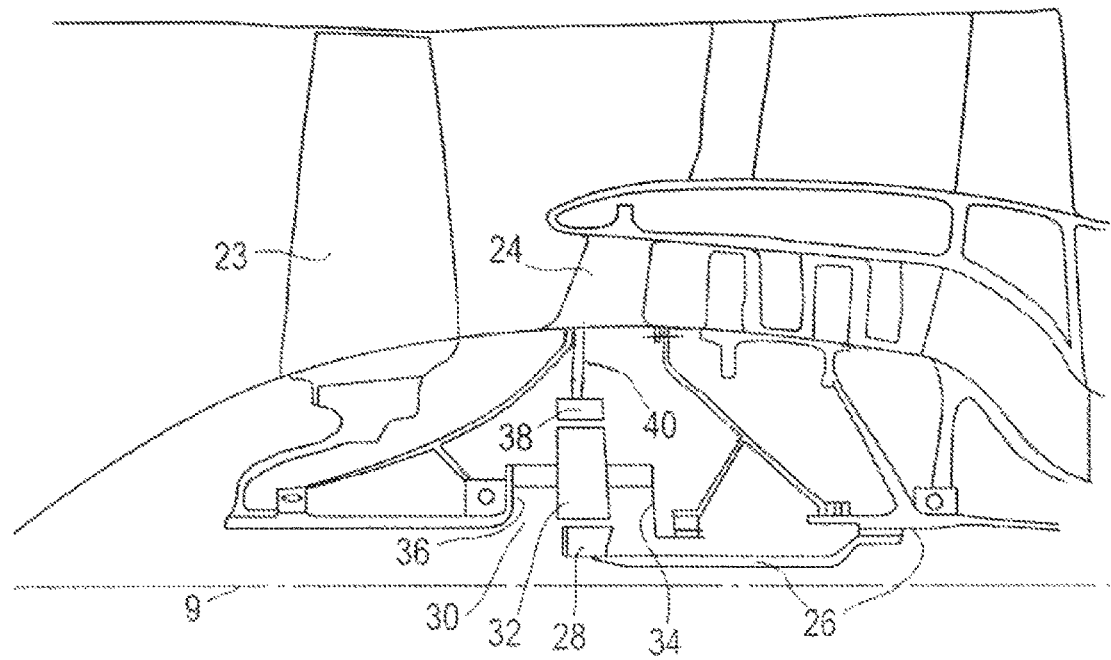
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26 (or spool), which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 (or spool) with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
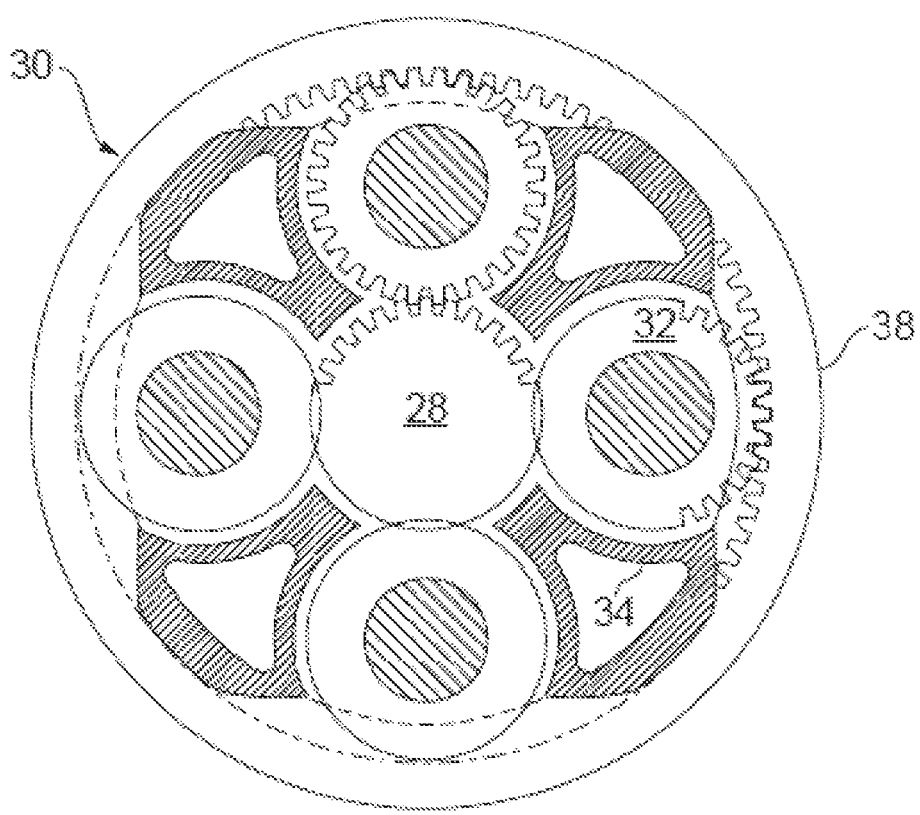
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
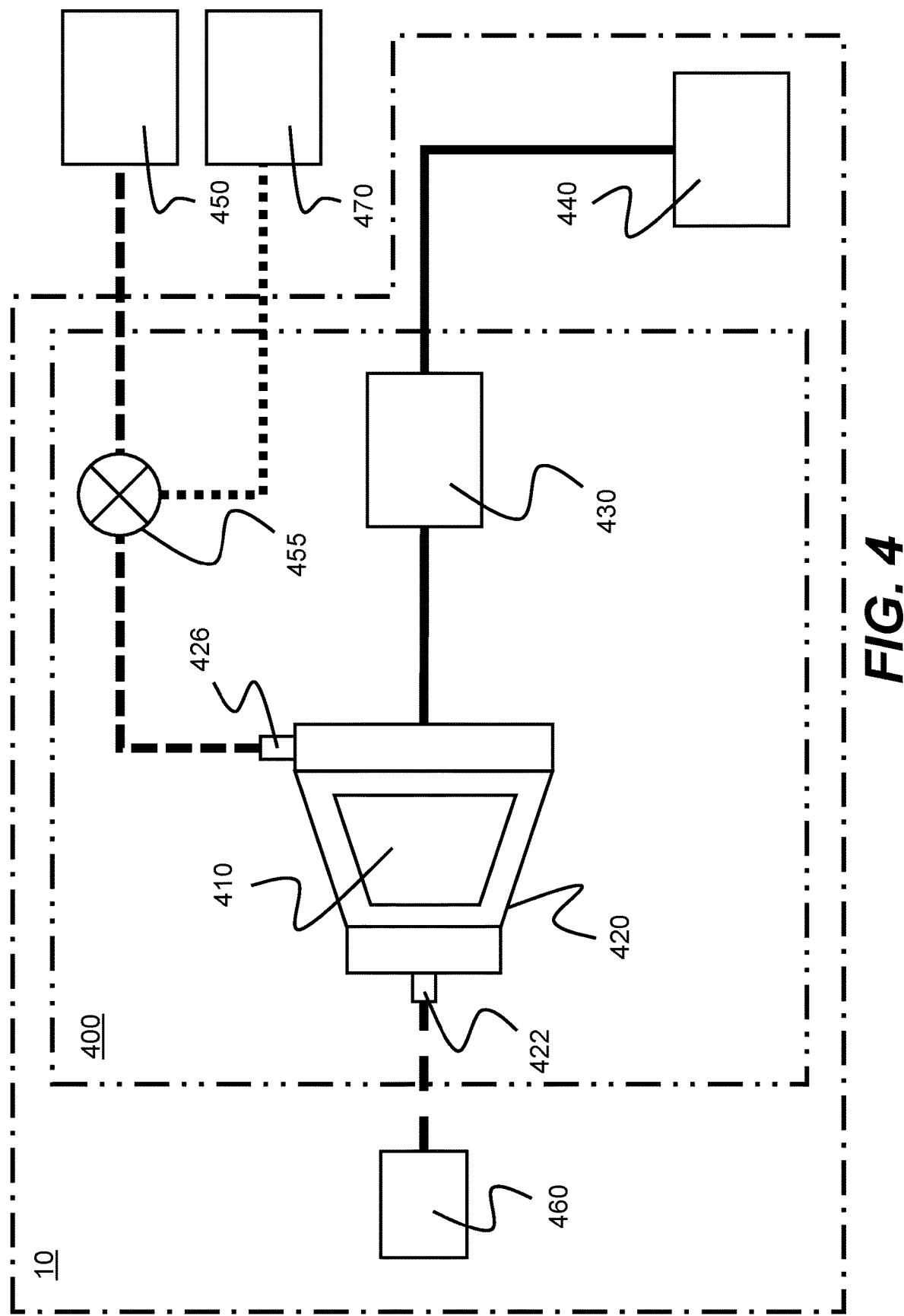
FIG. 4 is a diagram which shows an example blower assembly for providing air to an airframe system.

A diagram of an example blower assembly 400 for providing air to an airframe system is shown schematically in FIG. 4. The blower assembly 400 comprises a rotor 410 which is configured to be mechanically coupled to a spool 440 of a gas turbine engine. The spool may, for example, be the high-pressure (HP) spool of a two- or three-shaft gas turbine or an intermediate pressure (IP) spool of a three-spool engine, though any one or more spools of a gas turbine engine may be coupled to the rotor. The rotor 410 is disposed within a rotor housing 420. In the example of FIG. 4, the blower assembly 400 comprises a variable transmission 430 for mechanically coupling the rotor 410 to the spool 440. The blower assembly 400 is moveable between a compressor configuration and a turbine configuration by relative movement between the rotor 410 and a flow modifier.

The rotor 410 is configured to be driven to rotate by the spool 440 in the compressor configuration, whereby the blower assembly 410 compresses air it receives from the gas turbine engine. The compressed air is discharges to an airframe discharge nozzle 426 for supply to an airframe system 450 for an airframe pressurisation purpose. The airframe pressurisation purpose may be, for example, wing anti-icing, fuel tank inerting, cargo bay smoke eradication and/or aircraft cabin pressurisation. In the example of FIG. 4, the rotor is configured to receive air from the gas turbine engine via an engine bleed nozzle 422. The engine bleed nozzle 422 is in fluid communication with an air pathway (shown schematically at 460) of the gas turbine engine. Accordingly, in the compressor configuration, the blower assembly 400 is configured to draw air from the air pathway 460 of the gas turbine engine and supply air to the airframe system 450, for example to pressurise and/or ventilate an aircraft cabin.

The blower assembly 400 is configured to function as a compressor in the compressor configuration, such that air supplied to the airframe system 450 is at a higher pressure than air drawn from the air pathway 460 of the gas turbine engine. As a result, the blower assembly 400 is not required to draw air from a relatively high pressure region of the gas turbine engine in order to supply pressurised air to the airframe system 450. Instead, the blower assembly 400 may draw air via the engine bleed nozzle 422 from a relatively low pressure region of the gas turbine engine, such as from a bypass duct 22 of the gas turbine engine as shown in FIG. 1. If the blower assembly 400 were alternatively required to draw air from a relatively high pressure region of the gas turbine engine (e.g. the high pressure compressor), an efficiency of the gas turbine engine may be reduced. Therefore, the blower assembly 400 provides a more efficient airframe system pressurisation and ventilation system when incorporated into an aircraft. In addition, this approach reduces a scope for contamination of the air supply to the airframe system 450.

The rotor 410 is driven to rotate in the compressor configuration by the variable transmission 430, which itself receives drive input from the spool 440, for example through an accessory gearbox of the gas turbine engine. The speed of rotation of the spool 440 depends on the operating point of the gas turbine engine, which dictates a speed of the spool 440. The variable transmission 430 allows a rotational speed of the rotor 410 in the compressor configuration to be decoupled from a rotational speed of the spool 440, so that a compression performance of the blower assembly 400 in the compressor configuration is not solely governed by the operating point of the gas turbine engine (e.g. it can be controlled to operate at a target speed independent of the rotational speed of the spool, and/or at a variable speed ratio relative to the rotational speed of the spool). Inclusion of a variable transmission 430 within the blower assembly 400 therefore provides more versatile and adaptable means for supplying pressurised air to an airframe system. Various suitable variable transmission types will be apparent to those of ordinary skill in the art. For example, the variable transmission 430 may comprise an electric variator, as described in EP 3517436 B1.

The blower assembly 400 is also configured to be able to receive compressed air from an external air source 470 to drive the spool 440 to rotate for starting the gas turbine engine in the turbine configuration. In the example of FIG. 4, the blower assembly is configured to receive compressed air from the external air source 470 via the airframe discharge nozzle 426. In addition, the blower assembly 400 further comprises a start control and isolation valve 455 which is configured to isolate the airframe discharge nozzle 426 from the external air source 470 in the compressor configuration, and to isolate the airframe discharge nozzle 426 from the airframe system 450 in the turbine configuration. The start control and isolation valve 455 may be further configured to control a mass flow and a pressure of an air flow from the external air source 470 to the airframe discharge nozzle 426 in the turbine configuration. However, it will be appreciated that the blower assembly 400 may otherwise be configured to receive compressed air from the external air source 470, such as via an external air nozzle, for example.

The external air source 470 may be derived from, for example, an auxiliary power unit (APU) of the aircraft or ground starting equipment (GSE). In the example of FIG. 4, the blower assembly 400 is configured to discharge air to the engine bleed nozzle 422 in the turbine configuration. However, the blower assembly 400 may otherwise discharge air in the turbine configuration, such as to a dedicated auxiliary nozzle, for example. Air discharged from the blower assembly 400 via a dedicated auxiliary nozzle may be used for cooling other systems and/or components of the gas turbine engine and/or the aircraft in the turbine configuration.

The blower assembly 400 is configured to function as a turbine in the turbine configuration, such that the spool 440 may be driven to rotate by the rotor 410. Generally, the blower assembly 400 can drive rotation of the spool 440 to a rotational speed which is sufficient to enable the gas turbine engine to successfully execute an ignition process. Consequently, the blower assembly 400 dispenses with a need to provide a dedicated air turbine starting system or an electric starting system to the gas turbine engine, each of which are associated with additional weight and system complexity. Additionally or alternatively, the blower assembly 400 may be able to drive the spool 440 to rotate at a lower speed, for example to prevent the formation of a bowed engine rotor condition following engine shutdown or to reduce a bowed engine rotor condition prior to engine start. To this end, the start control and isolation valve 455 may be configured to control the mass flow and pressure of the air flow to a somewhat lower level than that required for engine starting.

The use of a two-configuration blower assembly 400 allows for an assembly in which the rotor 410 rotates in the same rotation direction (i.e. clockwise or anti-clockwise) in both the compressor configuration and the turbine configuration. In this way, in the turbine configuration of the blower assembly 400 the rotor 410 will drive the spool 440 to rotate in direction that the spool 440 rotates when it drives the rotor 410 in the compressor configuration. This allows for the omission of a separate reversing mechanism to permit the spool 440 to be driven to rotate in its starting direction, which will be the same as the direction it rotates during when driving the rotor 410 in the compressor configuration. A separate reversing mechanism would result in additional mechanical efficiency losses in, and increased weight of and/or a reduced reliability of, the blower assembly 400.

FIG. 4 also schematically shows a gas turbine engine 10 comprising the first example blower assembly 400. The gas turbine engine 10 may be in accordance with the gas turbine engine 10 described above with respect to FIG. 1 and/or FIG. 2.

Various examples of a blower assembly in accordance with the blower assembly 400 described above with respect to FIG. 4 will now be described with reference to FIGS. 5A-7C, with like reference numerals being used to indicate common features.

FIGS. 5A-5B show a front or axial view (with respect to a rotation axis of the rotor) of an example blower assembly 400 in a compressor configuration and in a turbine configuration, respectively. The blower assembly 400 comprises a rotor 410 configured to be mechanically coupled to a spool of a gas turbine engine. In the example of FIGS. 5A-5B, the flow modifier of the blower assembly 400 comprises a diffuser vane array 510 comprising a plurality of diffuser vanes 515, and a nozzle guide vane array 520 comprising a plurality of nozzle guide vanes 525.

In the compressor configuration, as shown in FIG. 5A, the diffuser vane array 510 is disposed around the rotor 410 and is configured to act together with the rotor 410 to compress air received at the rotor 410 by converting kinetic energy of air received from the rotor 410 into pressure energy. Conversely, in the turbine configuration, as shown in FIG. 5B, the nozzle guide vane array 520 is disposed around the rotor 410 and is configured to act together with the rotor 410 to expand air received at the nozzle guide vane array 520 by converting pressure energy of air received at the nozzle guide vane array 520 into kinetic energy and to guide the air at an optimised approach angle into the rotor 410.

A geometry of each of the plurality of diffuser vanes 515 of the array may be selected so as to optimise an aerodynamic performance of the diffuser vane array 510 without compromising an aerodynamic performance of the nozzle guide vane array 520. Likewise, a geometry of each of the plurality of nozzle guide vanes 525 may be selected so as to optimise an aerodynamic performance of the nozzle guide vane array 520 without compromising an aerodynamic performance (i.e. a turbine function) of the nozzle guide vane array 510. Accordingly, an overall performance of the blower assembly 400 in both the compressor configuration and the turbine configuration may be improved by providing dedicated flow modifiers for the respective modes of operation, rather than, for example, attempting to provide a single configuration through which the flow merely passes in different directions.

The geometries of each of the plurality of diffuser vanes 515 and of each of the plurality of nozzle guide vanes 525 is predetermined and fixed in use. It may be that angles of attack of each of the plurality of diffuser vanes 515 and of each of the plurality of nozzle guide vanes is predetermined and fixed in use. By providing a fixed configuration of the respective aerodynamic components, dynamic sealing losses associated with variable geometry and/or rotatable vanes may be eliminated or reduced, and the overall performance of the blower assembly 400 may be improved in the compressor configuration and/or the turbine configuration relative to alternative blower assemblies having such features.

The example blower assembly 400 further comprises an actuator arrangement 530 configured to cause relative movement between the rotor 410 and the diffuser vane array 510 so that the diffuser vane array 510 is disposed around the rotor 410 for operating in the compressor configuration. Similarly, the actuator arrangement 530 is also configured to cause relative movement between the rotor 410 and the nozzle guide vane array 520 so that the nozzle guide vane array 520 is disposed around the rotor 410 for operating in the turbine configuration.

The actuator arrangement 530 may be further configured to adjust an effective axial height of the diffuser vanes 515 by varying an open area of an inlet interface 540 between the rotor 410 and the diffuser vane array 510, and/or by varying an open area of an outlet interface 550 at a radially outer side of the diffuser vane array 510, wherein the effective axial height of the diffuser vanes 515 is defined with respect to a rotational axis of the rotor 410. In some examples, the actuator arrangement 530 may be configured to adjust an effective axial height of the diffuser vanes 515 by varying a cross-sectional area of the diffuser vane array 510 at a location between the inlet interface 540 and the outlet interface 550. Accordingly, in the compressor configuration, a compression performance of the blower assembly 400 may be adjusted to meet a compression demand associated with, for example, an airframe system.

Example actuator arrangements will now be described with reference to FIGS. 6A-7C, with like reference numerals being used to indicate common features.

Figures 6A, 6B, 6C:
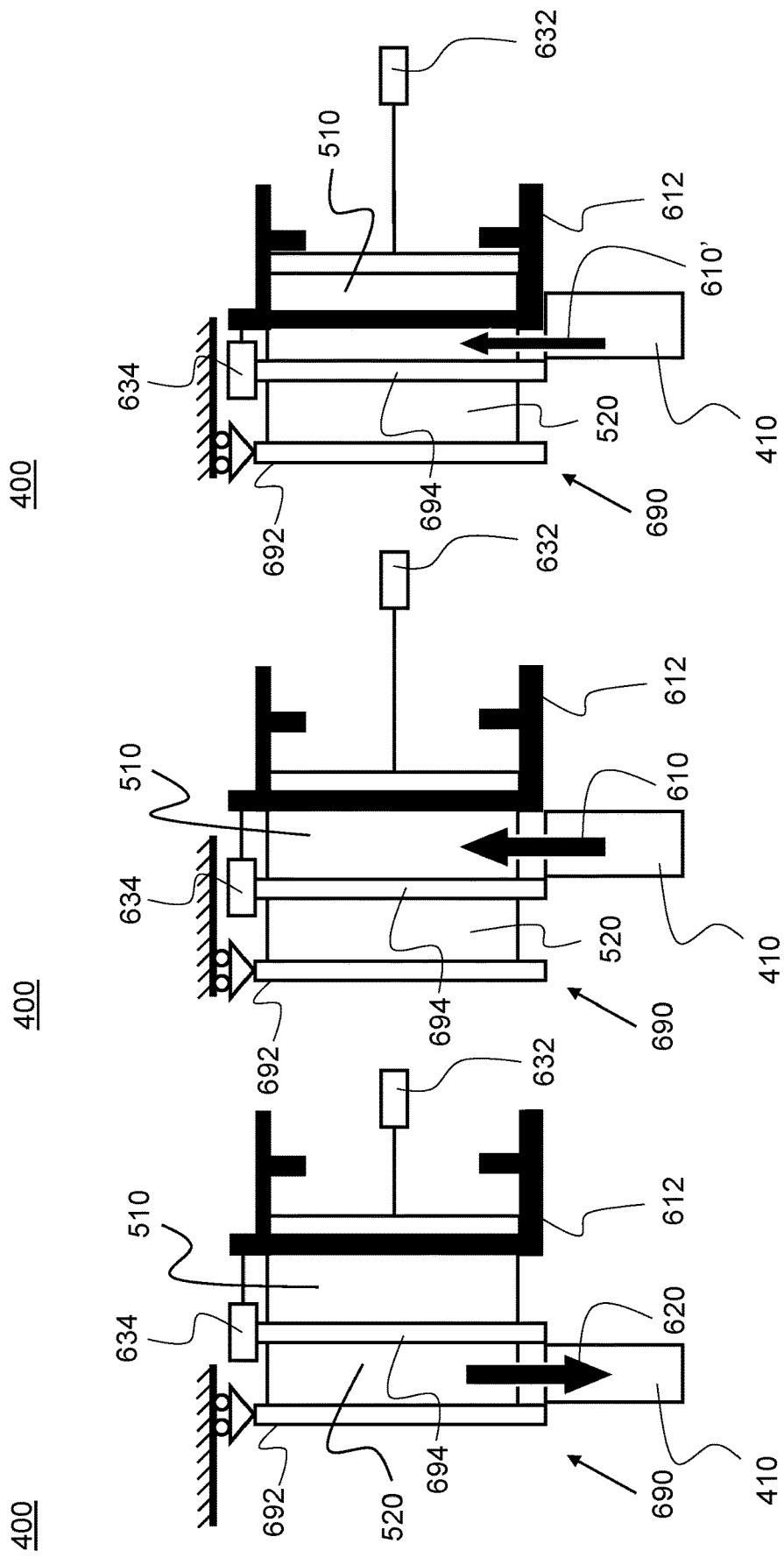
FIGS. 6A-6C show cross-sectional views of an example blower assembly in the compressor configuration and the turbine configuration.

FIG. 6A shows a cross-sectional view of the blower assembly 400 in the turbine configuration, corresponding to the front (or axial) view shown in FIG. 5B. In this example, the diffuser vane array 510 and the nozzle guide vane array 520 are rigidly connected so as to form a combined vane array assembly 690. The actuator arrangement 530 comprises a mode actuator 632 (i.e. an actuator to move the blower assembly between the respective configurations for the respective different modes) and a diffuser height actuator 634, although in variant embodiments there may be no diffuser height actuator. The mode actuator 632 is configured to cause relative movement between the rotor 410 and the combined vane array assembly 690 for moving the blower assembly 400 between the compressor configuration and the turbine configuration. In the turbine configuration, the nozzle guide vane array 520 is positioned with respect to the rotor 410 so as to allow air to flow through the nozzle guide vane array 520 and to the rotor 410 in a direction having a radially inward component (e.g. a compound tangential and radial direction), as indicated by the arrow 620. In this particular example, the combined vane array assembly 690 is configured to translate along an axial direction while the rotor 410 maintains a static axial position, such that the combined vane array assembly 690 may be referred to as a translating vane array assembly.

FIG. 6B shows a cross-sectional view of the blower assembly 400 in the compressor configuration, corresponding to the front/axial view shown in FIG. 5A. By comparison of FIGS. 6A and 6B, the function of the mode actuator 632 in moving the combined vane array assembly 690 relative to the rotor 410 can be seen. In the compressor configuration, the mode actuator 632 has positioned the diffuser vane array 510 with respect to the rotor 410 so as to allow air to flow from the rotor 410 and through the diffuser vane array 510 in a direction having a radially outward component (e.g. a compound tangential and radial direction), as indicated by the arrow 610.

The diffuser height actuator 634 of this example is configured to cause relative movement between the diffuser vane array 510 and a diffuser vane array guide 612. A position of the diffuser vane array guide 612 governs an effective axial height of the diffuser vanes 515. Specifically, the position of the diffuser vane array guide 612 with respect to the diffuser vane array 510 governs a size of an open area of an inlet interface 540 between the rotor 410 and the diffuser vane array 510, and also governs the open area of the outlet 550 at a radially outer side of the diffuser vane array 510. That is, the position of the diffuser vane array guide 612 with respect to the diffuser vane array 510 governs a size of a cross sectional-area of the diffuser vane array 510 between the inlet interface 540 and the outlet interface 550.

Consequently, in the example of FIGS. 6A-6C, the diffuser height actuator 634 is configured to adjust the effective axial height of the diffuser vanes 515 by varying the open area of the inlet interface 540 and varying an open area of an outlet 550. However, it will be appreciated in other examples, that the diffuser height actuator 634 may only be configured to vary the open area of the inlet interface 540 or to vary the open area the outlet 550.

In FIGS. 6A and 6B, the diffuser vane array guide 612 is in a retracted position in which the diffuser vane array guide 612 is positioned so as not to reduce the effective axial height of the diffuser vanes 515 and thereby not to inhibit a flow of air from the rotor 410 through the diffuser vane array 510.

FIG. 6C shows another cross-sectional view of the blower assembly 400 in the compressor configuration, corresponding to the front view shown in FIG. 5A. However, in FIG. 6C, the diffuser vane array guide 612 is in an extended position. Therefore, the diffuser vane array guide 612 is positioned so as to reduce the effective axial height of the diffuser vanes 515 and thereby inhibit a flow of air from the rotor 410 through the diffuser vane array 510 in the direction shown by the arrow 610'. In this way, the compression performance of the blower assembly 400 may be adjusted to meet a compression demand and/or a flow demand associated with, for example, an airframe system.

By comparison of FIGS. 6B and 6C, the function of the diffuser height actuator 634 in moving the diffuser vane array guide 612 relative to the diffuser vane array 510 can be seen. The provision of both the reconfiguration actuator 632 and the diffuser height actuator 634 allows the diffuser vane array guide 612 to be moved between the retracted position and the extended position independently of whether the blower assembly 400 is in the compressor configuration or the turbine configuration.

Further, at least one dynamic seal may be provided to the blower assembly 400 proximal to and/or around the diffuser vane array 510 and/or the nozzle guide vane array 520 to minimise pressure losses associated with air leakages between the rotor 410 or the diffuser vane array 510 and an external environment in the compressor configuration and/or air leakages between the rotor 410 or the nozzle guide vane array 520 and the external environment in the turbine configuration.

In the examples of FIGS. 6A-6C, the diffuser vane array 510 and the nozzle guide vane array 520 are rigidly connected so as to form a combined vane array assembly 690. Accordingly, the flow modifier of the rotary assembly comprises the combined vane array assembly 690, and the two may be referred to interchangeably. The diffuser vane array 510 and the nozzle guide vane array 520 are separated by a septum plate 694. The diffuser vane array 510 is bounded by the septum plate 694 and a diffuser endplate 696, whereas the nozzle guide vane array 520 is bounded by the septum plate 694 and a nozzle guide vane endplate 692. However, it will be appreciated that in other examples, the diffuser vane array 510 and the nozzle guide vane array 520 may not be rigidly connected or may be otherwise connected, with one or more additional actuators being provided to the rotary assembly 400 causing relative movement between the rotor 410 and each vane array for operation in each configuration.

FIGS. 7A-7C show cross-sectional views of a further example blower assembly 400 which correspond to the cross-sectional views of the blower assembly shown in FIGS. 6A-6C. The blower assembly 400 shown in FIGS. 7A-7C is similar to the blower assembly 400 shown in FIGS. 6A-6C, with like reference numerals being used to indicate common features. Nevertheless, the blower assembly 400 shown in FIGS. 7A-7C differs from that shown in FIGS. 6A-6C in that the actuator arrangement 530 comprises a driving actuator 636 and a biasing member 638. The driving actuator 636 and the biasing member 638 are configured to cooperate to cause relative movement between the rotor 410 and the combined vane array assembly 610 for moving the blower assembly 400 between the compressor configuration and the turbine configuration and to adjust the effective axial height of the diffuser vanes 515. The biasing member may be of any suitable type, such as a mechanical or compressible gas spring.

The driving actuator 636 is configured to move the diffuser vane array guide 612 with respect to the rotor 410. The biasing member 638 is configured to bias the combined vane array assembly 690 to a position in which the diffuser vane array guide 612 is in the retracted position with respect to the diffuser vane array 510. Accordingly, for at least some of a range of travel of the diffuser vane array guide 612, the biasing member 638 acts on the combined vane array assembly 690 to maintain the retracted position with respect to the diffuser vane array guide 612.

By comparison of FIGS. 7A-7C, the cooperation of the driving actuator 636 and the biasing member 638 in causing relative movement between the rotor 410 and the combined vane array assembly 690 for moving the blower assembly 400 between the compressor configuration and the turbine configuration and adjusting the effective axial height of the diffuser vanes 515 can be seen.

Between FIGS. 7A and 7B, the driving actuator 636 moves the diffuser vane array guide 612 along a direction substantially parallel to a rotational axis of the rotor 410 toward the rotor 410, while the biasing member 638 holds the combined vane array assembly 690 to the position in which the diffuser vane array guide 612 is in the retracted position. Over this range of a travel of the diffuser vane array guide 612, the configuration of the actuation arrangement is such that the diffuser vane array guide 612 and the combined vane array assembly move in unison, with the effect of moving the blower assembly from the turbine to the compressor configuration.

Between FIGS. 7B and 7C, the driving actuator 636 moves the diffuser vane array guide 612 to axially overlap with the rotor 410, while the biasing member 638 acts to maintain the position of the combined vane array assembly 690 (for example, owing to a stop which prevents further movement of the combined vane array assembly 690, or because the biasing member 638 is configured so that the biasing force it applies to the combined vane array assembly does not drive the combined vane array assembly beyond its position in which the diffuser vane array surrounds the rotor 410), such that the diffuser vane array guide 612 adopts the extended position relative to the combined vane array assembly. It may be that the biasing member 638 is unable to prevent the diffuser vane array guide 612 from moving to the extended position as a result of a limit of a travel of the biasing member 638 and/or the provision of a stop which limits the movement of the combined vane array assembly 690, for example.

The provision of the driving actuator 636 and the biasing member 638 provides a relatively simple actuator arrangement 530, which comprises only a single controlled actuator and may therefore provide more reliable means for moving the blower assembly 400 between the compressor configuration and the turbine configuration in use.

In the examples of FIGS. 6A-7C, the diffuser vane array 510 and the nozzle guide vane array 520 are rigidly connected so as to form a combined vane array assembly 690. However, it will be appreciated that in other examples, the diffuser vane array 510 and the nozzle guide vane array 520 may not be rigidly connected or otherwise connected, with additional actuators being provided to the blower assembly 400 causing relative movement between the rotor 410 and each vane array for operation in each configuration.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A blower assembly for providing air to an airframe system, comprising:
   a rotor configured to be mechanically coupled to a spool of a gas turbine engine;
   a flow modifier configured to receive and/or direct flow to the rotor;
   wherein the blower assembly is configured to permit relative movement between the rotor and the flow modifier to move between:
   a compressor configuration in which the rotor is configured to be driven to rotate by the spool and to receive and compress air from the gas turbine engine, and discharge the compressed air for supply to the airframe system; and
   a turbine configuration in which the rotor is configured to receive air from an external air source to drive the spool to rotate;
   wherein the flow modifier comprises:
   a diffuser vane array comprising a plurality of diffuser vanes and configured to act together with the rotor to compress the air received at the rotor in the compressor configuration;
   a nozzle guide vane array comprising a plurality of nozzle guide vanes and configured to act together with the rotor to expand the air received at the nozzle guide vane array in the turbine configuration; and
   an actuator arrangement configured to:
   cause relative axial movement between the rotor and the diffuser vane array so that the diffuser vane array is disposed around the rotor for operation in the compressor configuration; and
   cause relative axial movement between the rotor and the nozzle guide vane array so that the nozzle guide vane array is disposed around the rotor for operation in the turbine configuration.

2. The blower assembly according to claim 1, further comprising a variable transmission for mechanically coupling the rotor to the spool.

3. The blower assembly according to claim 1, wherein the blower assembly is configured so that a direction of rotation of the rotor in the turbine configuration is the same as a direction of rotation of the rotor in the compressor configuration.

4. The blower assembly according to claim 1, wherein the flow modifier comprises a plurality of vanes.

5. The blower assembly according to claim 1, wherein the blower assembly comprises an actuator arrangement for causing the relative movement between the rotor and flow modifier to move the blower assembly between the compressor configuration and the turbine configuration.

6. The blower assembly according to claim 1, wherein the actuator arrangement is configured to adjust an effective axial height of the diffuser vanes by varying an open area of an inlet interface between the rotor and the diffuser vane array, and/or by varying an open area of an outlet interface at a radially outer side of the diffuser vane array, wherein the effective axial height is with respect to a rotational axis of the rotor.

7. The blower assembly according to claim 6, wherein the diffuser vane array and the nozzle guide vane array are rigidly connected so as to form a combined vane array assembly.

8. The blower assembly according to claim 7, wherein the actuator arrangement comprises:
   a mode actuator configured to cause relative movement between the rotor and the combined vane array assembly for moving the blower assembly between the compressor configuration and the turbine configuration; and
   a diffuser height actuator configured to adjust the effective axial height of the diffuser vanes.

9. The blower assembly according to claim 7, wherein the actuator arrangement comprises a driving actuator configured to cause relative movement between the combined vane array assembly and the rotor to move the blower assembly between the compressor configuration and the turbine configuration.

10. The blower assembly according to claim 9, wherein the actuator arrangement is configured to cause relative movement between a diffuser vane array guide and the combined vane array assembly to adjust the effective axial height of the diffuser vanes in the compressor configuration.

11. The blower assembly according to claim 10, wherein
   the driving actuator is configured to act on the diffuser vane array guide to cause relative movement between the diffuser vane array guide and the rotor over an actuator travel range;
   a first portion of the actuator travel range corresponds to movement between the turbine and compressor configurations;
   the actuator arrangement further comprises a biasing member configured to bias the combined vane array assembly and the diffuser vane array guide to an open configuration throughout the first portion of the actuator travel range, the open configuration corresponding to unrestrained flow through the diffuser vane array; and
   the actuator arrangement is configured so that a second non-overlapping portion of the actuator travel range corresponds to movement of the diffuser vane array guide relative to the combined vane array assembly away from the open configuration to vary the effective axial height of the diffuser vanes in the compressor configuration.

12. A gas turbine engine for an aircraft, the gas turbine engine comprising the blower assembly of claim 1.

13. An aircraft comprising:
   the blower assembly according to claim 1.

14. An aircraft comprising:
   a gas turbine engine comprising the blower assembly of claim 1.

15. The blower assembly according to claim 1, wherein the flow modifier is a fixed geometry flow modifier.

* * * * *